(12) United States Patent
Lam et al.

(10) Patent No.: US 10,289,617 B2
(45) Date of Patent: May 14, 2019

(54) ACCESSING ON-PREMISE AND OFF-PREMISE DATASTORES THAT ARE ORGANIZED USING DIFFERENT APPLICATION SCHEMAS

(71) Applicant: Oracle International Corporation, Redwood Shores, CA (US)

(72) Inventors: Yu Jun Lam, Folsom, CA (US); Laurentiu Busuioc, Livermore, CA (US); Yongran Huang, San Jose, CA (US); Anand Maurya, Sunnyvale, CA (US); Peter Ondrejka, Dunakeszi (HU); Laszlo Nyakas, Szigethalom (HU); Kyle I. Parent, San Mateo, CA (US); Paolo Juvara, San Francisco, CA (US); Wansoo Park, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 705 days.

(21) Appl. No.: 14/973,325

(22) Filed: Dec. 17, 2015

(65) Prior Publication Data
US 2017/0177662 A1    Jun. 22, 2017

(51) Int. Cl.
*G06F 16/00* (2019.01)
*G06F 16/2453* (2019.01)
*G06F 16/25* (2019.01)

(52) U.S. Cl.
CPC ........ *G06F 16/2453* (2019.01); *G06F 16/252* (2019.01)

(58) Field of Classification Search
CPC ......... G06F 17/30569; G06F 17/30386; G06F 17/30392; G06F 17/30421; G06F 16/24; G06F 16/25; G06F 16/254; G06F 16/252
See application file for complete search history.

(56) References Cited

U.S. PATENT DOCUMENTS

| 4,586,134 A | 4/1986 | Norstedt |
| 4,664,528 A | 5/1987 | Rodgers et al. |
| 4,823,122 A | 4/1989 | Mann et al. |
| 5,047,922 A | 9/1991 | Borkar |
| 5,247,671 A | 9/1993 | Adkins et al. |

(Continued)

OTHER PUBLICATIONS

Tsai, Wei-Tek, Xin Sun, and Janaka Balasooriya. "Service-oriented cloud computing architecture." Information Technology: New Generations (ITNG), 2010 Seventh International Conference on. IEEE, 2010.*

(Continued)

*Primary Examiner* — Nan Hutton
(74) *Attorney, Agent, or Firm* — Invoke (57) ABSTRACT

Techniques are disclosed for accessing on-premise and off-premise datastores organized using different application schemas. An interface serves requests, from a tenant, by accessing either the on-premise datastore or the off-premise datastore. The interface receives a request for a particular data set. Based on the request itself, the interface selects either the on-premise datastore or the off-premise datastore to retrieve the particular data set. The interface retrieves the particular data set from the selected datastore without attempting to retrieve the particular data set from the non-selected datastore. The interface transmits and/or presents the particular data set.

18 Claims, 5 Drawing Sheets

(56) References Cited

U.S. PATENT DOCUMENTS

| | | |
|---|---|---|
| 5,289,461 A | 2/1994 | De Nijs |
| 5,319,754 A | 6/1994 | Meinecke et al. |
| 5,392,285 A | 2/1995 | Kurts |
| 5,448,559 A | 9/1995 | Hayter et al. |
| 5,530,905 A | 6/1996 | Nichols et al. |
| 5,553,239 A | 9/1996 | Heath et al. |
| 5,553,242 A | 9/1996 | Russell et al. |
| 5,596,745 A | 1/1997 | Lai et al. |
| 5,598,536 A | 1/1997 | Slaughter et al. |
| 5,600,722 A | 2/1997 | Yamaguchi et al. |
| 5,600,791 A | 2/1997 | Carlson et al. |
| 5,617,540 A | 4/1997 | Civanlar et al. |
| 5,633,861 A | 5/1997 | Hanson et al. |
| 5,642,515 A | 6/1997 | Jones et al. |
| 5,682,534 A | 10/1997 | Kapoor et al. |
| 5,684,800 A | 11/1997 | Dobbins et al. |
| 5,734,659 A | 3/1998 | Mann et al. |
| 5,740,175 A | 4/1998 | Wakeman et al. |
| 5,761,507 A | 6/1998 | Govett |
| 5,771,349 A | 6/1998 | Picazo et al. |
| 5,774,660 A | 6/1998 | Brendel et al. |
| 5,774,668 A | 6/1998 | Choquier et al. |
| 5,790,800 A | 8/1998 | Gauvin et al. |
| 5,805,816 A | 9/1998 | Picazo et al. |
| 5,805,827 A | 9/1998 | Chau et al. |
| 5,805,920 A | 9/1998 | Sprenkle et al. |
| 5,828,879 A | 10/1998 | Bennett |
| 5,873,102 A | 2/1999 | Bridge et al. |
| 5,890,167 A | 3/1999 | Bridge et al. |
| 5,944,823 A | 8/1999 | Jade et al. |
| 5,963,556 A | 10/1999 | Varghese et al. |
| 5,974,463 A | 10/1999 | Warrier et al. |
| 5,978,849 A | 11/1999 | Khanna |
| 5,987,430 A | 11/1999 | Van et al. |
| 6,006,264 A | 12/1999 | Colby et al. |
| 6,088,728 A | 7/2000 | Bellemore et al. |
| 6,138,120 A | 10/2000 | Gongwer et al. |
| 6,310,883 B1 | 10/2001 | Mann et al. |
| 6,321,235 B1 | 11/2001 | Bird |
| 6,804,671 B1 | 10/2004 | Loaiza et al. |
| 6,950,848 B1 | 9/2005 | Yousefi Zadeh |
| 7,035,931 B1 | 4/2006 | Zayas et al. |
| 7,039,654 B1 | 5/2006 | Eder |
| 7,136,825 B2 | 11/2006 | Araki et al. |
| 7,174,379 B2 | 2/2007 | Agarwal et al. |
| 7,346,690 B1 | 3/2008 | Sinha et al. |
| 7,506,034 B2 | 3/2009 | Coates et al. |
| 7,512,686 B2 | 3/2009 | Berg |
| 7,822,717 B2 | 10/2010 | Kapoor et al. |
| 8,364,648 B1 | 1/2013 | Sim-Tang |
| 8,943,181 B2 | 1/2015 | Kasten et al. |
| 9,684,561 B1 | 6/2017 | Yan et al. |
| 2001/0027406 A1 | 10/2001 | Araki et al. |
| 2002/0112022 A1 | 8/2002 | Kazar et al. |
| 2002/0143733 A1 | 10/2002 | Mukkamalla et al. |
| 2002/0147652 A1 | 10/2002 | Gheith et al. |
| 2003/0023572 A1 | 1/2003 | Jowell et al. |
| 2003/0061537 A1 | 3/2003 | Cha et al. |
| 2003/0065986 A1 | 4/2003 | Fraenkel et al. |
| 2003/0081748 A1 | 5/2003 | Lipinski |
| 2003/0172145 A1 | 9/2003 | Nguyen |
| 2003/0208523 A1 | 11/2003 | Gopalan et al. |
| 2003/0229695 A1 | 12/2003 | Mc Bride |
| 2004/0030801 A1 | 2/2004 | Moran et al. |
| 2004/0117375 A1 | 6/2004 | Saha et al. |
| 2004/0176996 A1 | 9/2004 | Powers et al. |
| 2004/0205101 A1 | 10/2004 | Radhakrishnan |
| 2004/0221031 A1 | 11/2004 | Desai |
| 2004/0257985 A1 | 12/2004 | Sahai et al. |
| 2004/0267809 A1 | 12/2004 | East et al. |
| 2005/0038831 A1 | 2/2005 | Souder et al. |
| 2005/0038833 A1 | 2/2005 | Colrain et al. |
| 2005/0262183 A1 | 11/2005 | Colrain et al. |
| 2006/0143217 A1 | 6/2006 | Stanev et al. |
| 2007/0083563 A1 | 4/2007 | Souder et al. |
| 2007/0100912 A1 | 5/2007 | Pareek et al. |
| 2007/0244918 A1 | 10/2007 | Lee et al. |
| 2008/0027769 A1 | 1/2008 | Eder |
| 2008/0155688 A1 | 6/2008 | Casazza |
| 2009/0037769 A1 | 2/2009 | Babkin et al. |
| 2009/0183225 A1 | 7/2009 | Malakapalli et al. |
| 2009/0215469 A1 | 8/2009 | Fisher et al. |
| 2010/0185733 A1 | 7/2010 | Hon et al. |
| 2010/0205153 A1 | 8/2010 | Lamm |
| 2010/0250712 A1 | 9/2010 | Ellison et al. |
| 2010/0318570 A1 | 12/2010 | Narasinghanallur et al. |
| 2011/0004586 A1 | 1/2011 | Cherryholmes et al. |
| 2011/0060724 A1 | 3/2011 | Chan |
| 2011/0087633 A1 | 4/2011 | Kreuder et al. |
| 2011/0112901 A1 | 5/2011 | Fried et al. |
| 2011/0126118 A1 | 5/2011 | Bergeron et al. |
| 2011/0258243 A1 | 10/2011 | Katte et al. |
| 2011/0307450 A1 | 12/2011 | Hahn et al. |
| 2011/0314035 A1 | 12/2011 | Brunet et al. |
| 2012/0075648 A1 | 3/2012 | Keys et al. |
| 2012/0079080 A1 | 3/2012 | Pishevar |
| 2012/0109926 A1 | 5/2012 | Novik et al. |
| 2012/0226659 A1 | 9/2012 | Ball et al. |
| 2012/0227086 A1 | 9/2012 | Dale et al. |
| 2013/0085742 A1 | 4/2013 | Barker et al. |
| 2013/0117237 A1 | 5/2013 | Thomsen et al. |
| 2013/0198824 A1 | 8/2013 | Hitchcock et al. |
| 2013/0212068 A1 | 8/2013 | Talius et al. |
| 2013/0226816 A1 | 8/2013 | Chory et al. |
| 2013/0262513 A1 | 10/2013 | Rau et al. |
| 2014/0006344 A1 | 1/2014 | Narasinghanallur et al. |
| 2014/0090084 A1 | 3/2014 | Goodinson |
| 2014/0095452 A1 | 4/2014 | Lee et al. |
| 2014/0095530 A1 | 4/2014 | Lee et al. |
| 2014/0095546 A1 | 4/2014 | Kruglikov et al. |
| 2014/0164318 A1* | 6/2014 | Tsai .................. G06F 17/30292 707/609 |
| 2014/0164331 A1 | 6/2014 | Li et al. |
| 2014/0222824 A1 | 8/2014 | Joshi et al. |
| 2015/0254240 A1 | 9/2015 | Li et al. |
| 2016/0094584 A1* | 3/2016 | Mehta .................. H04L 63/20 726/1 |
| 2016/0119155 A1 | 4/2016 | Marlow |

OTHER PUBLICATIONS

Bhoyar, Rahul, and Nitin Chopde. "Cloud computing: Service models, types, database and issues." International Journal of Advanced Research in Computer Science and Software Engineering 3.3 (2013).*

Dillon, Tharam, Chen Wu, and Elizabeth Chang. "Cloud computing: issues and challenges." Advanced Information Networking and Applications (AINA), 2010 24th IEEE International Conference on. Ieee, 2010.*

Wu, Jiyi, et al. "Cloud storage as the infrastructure of cloud computing." Intelligent Computing and Cognitive Informatics (ICICCI), 2010 International Conference on. IEEE, 2010.*

AppZero, "AppZero is the Fastest and Most Flexible Way to Move Server Applications to and Across Any Clouds or Datacenter Servers—With no Code Change and Zero Lock-in", AppZero, Copyright 2013, 1 page.

AppZero, "Moving Enterprise Apps to the Cloud", AppZero, Cloud migration: enterprise apps on the move, Copyright 2013, 9 pages.

Zhu, Yangpeng, "A Platform for Changing Legacy Application to Multi-tenant Model", International Journal of Multimedia and Ubiquitous Engineering, vol. 9, No. 8, 2014, pp. 407-418.

Sellis Tim, "Multiple-query Optimization", ACM Transactions on Database Systems, dated Mar. 1988.

Rajeev Kumar Jha: "Container Database and Pluggable Database (CDB& PDB)", Aug. 8, 2012 (Aug. 8, 2012), pp. 1-2, XP055091522, Retrieved from the Internet: URL:http://rajeevjhaoracle.wordpress.com/2012/08/08/container-database-and-pluggable-database-cdb-pdb/-database-cdb-pdb/ [retrieved on Dec. 4, 2013].

Preimesberger, Chris, "Oracle Profits Up, but Revenues Slip" Oracle, dated Sep. 20, 2012, 2 pages.

Pachot, Frank, "Oracle 12cR2: MAX_PDBS", dated Nov. 11, 2016, https://blog.dbi-services.com/oracle-12cr2-max_pdbs/, 12 pages.

(56) References Cited

OTHER PUBLICATIONS

Oracle7 Enterprise Backup Utility Administrators's Guide, Copyright 1997, Oracle Corporation.
Oracle Base, Multitenant: Create and Configure a Pluggable Database (PDB) in Oracle Database 12c Release 1(12.1), dated Jan. 8, 2014.
Muhamnad Anwar "How to install Oracle 12c Multitenant Pluggable Database", Feb. 24, 2012.
Francisco Munoz et al., "Oracle Database 12c Backup and Recovery Survival Guide", dated Sep. 24, 2013, 8 pages.
Dominic Betts et al., "Developing Multi-Tenant Applications for the Cloud," 3rd Edition, Microsoft, 2012, 246 pages.
DBA I, Practice-Control and Redo Log Files, Computer Science and Engineering Department, Nov. 1, 2009, http://andrei.clubcisco.ro/cursuri/5master/abd/4._Control_and_Redo_Log_Files.pdf.
Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.
Anonymous: "Oracle-Base—Multitenant: Overview of Container Databases (CDB) and Pluggable Databases (PDB)", dated Mar. 3, 2014, 4 pages.
Anonymous, :An Oracle White Paper Oracle Database Appliance: Migration Strategies, dated Jun. 2012, 13 pages.

* cited by examiner

ACCESSING ON-PREMISE AND OFF-PREMISE DATASTORES THAT ARE ORGANIZED USING DIFFERENT APPLICATION SCHEMAS

INCORPORATION BY REFERENCE; RELATED APPLICATIONS

This application is related to U.S. patent application Ser. No. 14/973,256, filed Dec. 17, 2015, which is hereby incorporated by reference.

This application is also related to U.S. patent application Ser. No. 13/631,815, filed Sep. 28, 2012, now published as U.S. Patent Application Publication No. 2014/0095530, published Apr. 3, 2014, which claims priority to U.S. Provisional Patent Application No. 61/707,726, filed Sep. 28, 2012; and U.S. Provisional Patent Application No. 61/707,726, filed Sep. 28, 2012; all of which are hereby incorporated by reference.

TECHNICAL FIELD

The present disclosure relates to multi-tenant, cloud-based hardware and/or software services. In particular, the present disclosure relates to accessing on-premise and off-premise datastores that are organized using different application schemas.

BACKGROUND

In a multi-tenant, cloud-based environment, multiple tenants use one or more applications executing on shared computing resources. The shared computing resources may be located in data centers off the tenant's own premises (referred to herein as an "off-premise environment").

In some cloud-based environments, a separate instance of a server is created for each tenant, either physically or via virtualization. Each instance of a server implements separate application code and application schema for each tenant.

In other cloud-based environments, a shared instance of a server is created for multiple tenants. The shared instance of the server implements the same application code for multiple tenants. The shared instance of the server also implements a common application schema for the tenants. Data sets for the multiple tenants are organized using the common application schema and indexed by tenant identifier (ID).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. MULTI-DATASTORE ARCHITECTURE
   a. OFF-PREMISE ENVIRONMENT
   b. ON-PREMISE ENVIRONMENT
   c. SINGLE INTERFACE FOR OFF-PREMISE AND ON-PREMISE ENVIRONMENTS
3. ACCESSING ON-PREMISE AND OFF-PREMISE DATASTORES THAT ARE ORGANIZED USING DIFFERENT APPLICATION SCHEMAS
4. EXAMPLE EMBODIMENTS
5. CLOUD ENVIRONMENTS
6. MISCELLANEOUS; EXTENSIONS
7. HARDWARE OVERVIEW

1. GENERAL OVERVIEW

One or more embodiments include an interface serving requests, from a tenant, by accessing either an on-premise datastore or an off-premise datastore. The on-premise datastore may be a traditional datastore that is implemented using an on-premise application. The off-premise datastore may be a cloud-based datastore that is implemented using a cloud-based application. As an example, a single interface, serving datastores in both environments, allows an entity to use the single interface to access data sets without fully migrating the data sets from an on-premise environment to the off-premise environment. The entity may partially migrate some data sets and/or applications to the off-premise environment, while maintaining some data sets and/or applications at the on-premise environment.

One or more embodiments include an application selecting one of an off-premise datastore or an on-premise datastore to serve a request based on the request itself. The application executes an interface at an (a) off-premise environment corresponding to the off-premise datastore or (b) an on-premise environment corresponding to the on-premise datastore. The interface, executed by an application, receives a request for a particular data set. The request does not include a specification of which datastore is to be accessed. The application selects one of the datastores based on the request. The application retrieves the particular data set from the selected datastore without attempting to retrieve the particular data set from the non-selected datastore. The application transmits and/or presents the particular data set at the interface.

2. MULTI-DATASTORE ARCHITECTURE

Figure 1A:
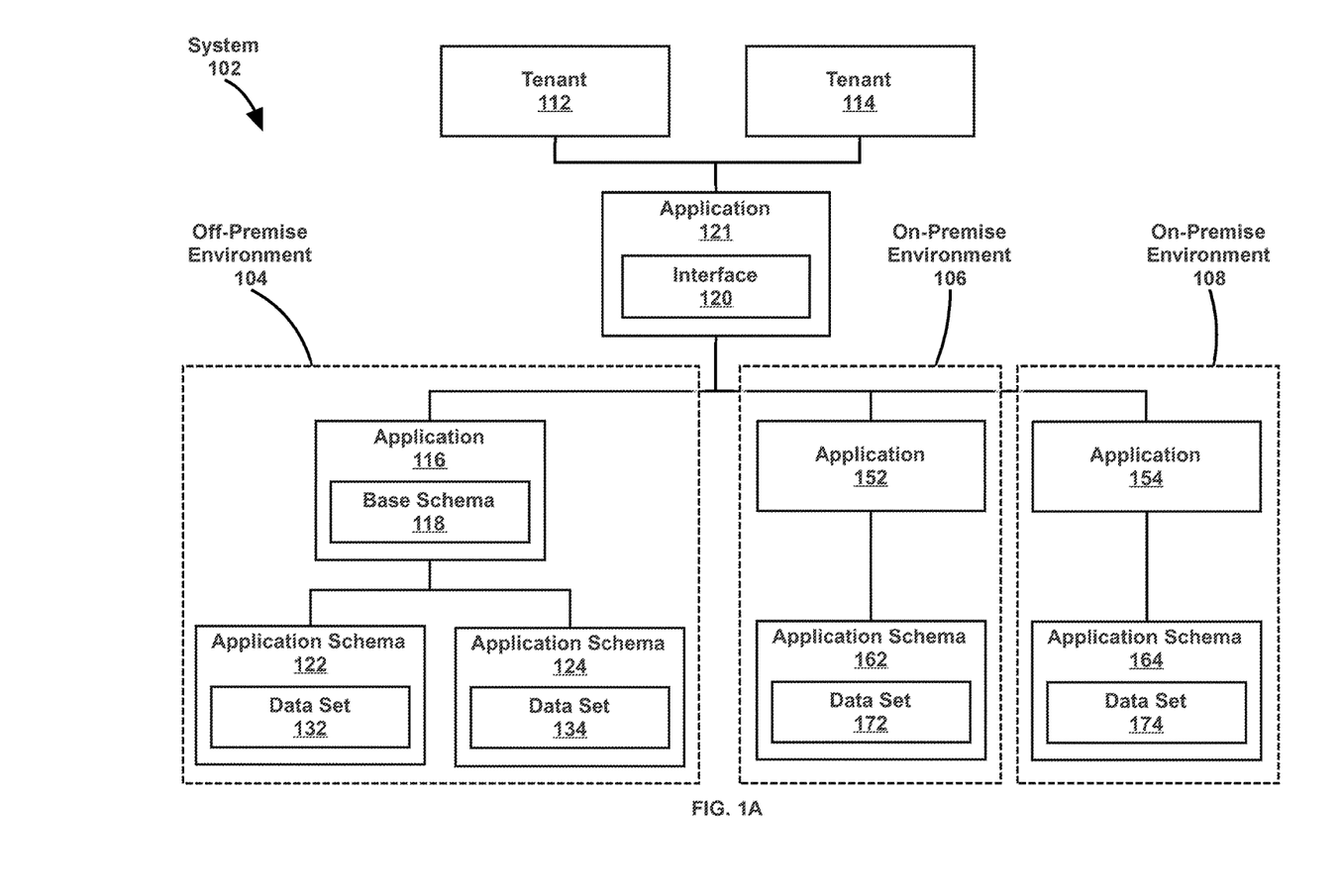
FIG. 1A illustrates a multi-datastore architecture, in accordance with one or more embodiments.

FIG. 1A illustrates a multi-datastore architecture in accordance with one or more embodiments. The multi-datastore architecture (including modifications thereof) may be used in serving data from multiple datastores which may be distributed across an on-premise environment and an off-premise environment. The multi-datastore architecture is illustrated in FIG. 1A as a system of components, referred to as system 102.

As illustrated in FIG. 1A, system 102 includes tenants 112-114, an application 121, an interface 120, an off-premise environment 104, and on-premise environments 106-108. Off-premise environment 104 includes application 116, base schema 118, application schemas 122-124, and data sets 132-134. On-premise environment 106, corresponding to tenant 112, includes application 152, application schema 162, and data set 172. On-premise environment 108, corresponding to tenant 114, includes application 154, application schema 164, and data set 174.

In one or more embodiments, system 102 may include more or fewer components than the components illustrated in FIG. 1A. The components illustrated in FIG. 1A may be local to or remote from each other. The components illustrated in FIG. 1A may be implemented in software and/or hardware and may be distributed over one or more applications and/or machines. Operations described with respect to one component may instead be performed by another component.

In one or more embodiments, a tenant (such as tenant 112 and/or tenant 114) is a corporation, organization, enterprise or other entity that accesses a shared computing resource, such as application 116. In an embodiment, tenant 112 and tenant 114 are independent from each other. A business or operation of tenant 112 is separate from a business or operation of tenant 114. As described below, data and operations associated with different tenants may be isolated from one another.

A. Off-Premise Environment

In one or more embodiments, off-premise environment 104 includes one or more devices that are remote from the premises of tenants 112-114. Off-premise environment 104 may include, for example, one or more data centers located remote to corporate offices. Off-premise environment 104 is accessed via a public network, such as the Internet, using a communications protocol, such as Hypertext Transfer Protocol (HTTP). In an embodiment, off-premise environment 104 includes hardware executing application 116 and datastores organized using application schemas 122-124.

In an embodiment, off-premise environment 104 may refer to a cloud environment that is accessed by multiple tenants 112-114. The cloud environment includes a centralized pool of resources that are shared amongst the multiple tenants 112-114. Examples of resources include a processor, a server, a data storage, a virtual machine, and a platform. Client devices of tenants 112-114 may independently request computing services, such as server time and network storage, as needed. The resources assigned to each particular client device may be scaled up or down based on the computing services requested by the particular client device. The resources assigned to each particular client device may also be scaled up or down based on the aggregated demand for computing services requested by all client devices.

In an embodiment, data sets stored at off-premise environment 104 that correspond to different tenants are isolated from each other. As illustrated in FIG. 1A, data set 132 corresponds to tenant 112, and data set 134 corresponds to tenant 114. Tenant isolation may be achieved using, for example, tenant identifiers (IDs), application schemas 122-124, and/or tenant-specific overlay networks. Examples of operations executed within a cloud environment to manage resources and implement tenant isolation are described below in Section 5, titled "Cloud Environments."

Continuing with FIG. 1A, application 116 includes executable code and/or logic that is configured to execute operations, such as retrieving and/or accessing one or more data sets 132-134. Application 116 is a shared computing resource available to tenants 112-114. Application 116 executes on hardware (such as one or more servers and/or computers) located in an off-premise environment 104.

In one or more embodiments, base schema 118 indicates the names of data fields, the number of data fields, the number of tables, and other aspects of a default datastore that is used by application 116. Base schema 118 indicates the basic features and/or functions of a default datastore that is used by application 116. Base schema 118 is shared amongst tenants 112-114 and is modified and/or customized to form application schemas 122-124.

In one or more embodiments, an application schema (such as application schema 122 and/or application schema 124) indicates the names of data fields, the number of data fields, the number of tables, and other aspects of a particular datastore that is used by application 116. The particular datastore corresponds to a particular tenant (such as tenant 112). Differences between base schemas and application schemas are further detailed below.

In an embodiment, each data field is associated with a name and a data field identifier (ID). A name of a data field, as referred to herein, is a set of words, text, and/or characters that is displayed at a user interface to reference the data field. As an example, a particular data field may be named, "Date." A user interface may display a textbox for inputting a value into the particular data field. The user interface may display the name "Date" adjacent to the textbox, to indicate which data field is being modified by user input entered into the textbox. An identifier of a data field, as referred to herein, is a set of words, text, and/or characters that is used by executable code and/or logic of application 116 to reference the data field. As an example, a particular data field may have the identifier, "1234." An application may perform certain operations on the particular data field. The application may reference the particular data field by using the identifier, "1234." Each application schema may have different sets of data fields. A particular application schema may have a data field that overlaps with a data field of another application schema. A particular application schema may have a data field that is unique to the particular application schema and not included in other application schemas derived from a same base schema. Examples of overlapping data fields and unique fields are described in the examples below.

As an example, a data field of application schema 122 and another data field of application schema 124 may have a same data field ID but may be referenced by different names. The data field of application schema 122 and the data field of application schema 124, having the same data field ID, may be an overlapping data field of application schema 122 and application schema 124. The same data field ID would indicate that the same operations may be performed, by an application 116, on the data field of application schema 122 and the data field of application schema 124. However, the data fields may be referred to using different names. The different names may be, for example, "First Name" and "Given Name," both referring to a name of an individual.

As another example, a data field with a particular data field ID may exist in application schema 122 but not in application schema 124. The data field with the particular data field ID may be a unique data field to application schema 122. The data field may have been added in application schema 122 through customization of application schema 122. But the data field was not added in application schema 124.

In an embodiment, application schemas 122-124 are derived from base schema 118. A first set of modifications are made to base schema 118 to form application schema 122, and a second (different) set of modifications are made to base schema 118 to form application schema 124. The first set of modifications may include, for example, modifying a name of a data field already existing in base schema 118. The second set of modifications may include, for example, adding a data field for storing data that is applicable to tenant 114 but not to tenant 112. Hence, application schema 122 and application schema 124 indicate different names of data fields, different numbers of data fields, different numbers of tables, and/or other differences.

As an example, a base schema may be associated with storing data sets related to vehicles. A first application schema may be associated with pickup trucks. A data field that is applicable to pickup trucks and not already existing in the base schema may be a size of the truck bed. A data field for the size of the truck bed may be added to the base schema to form the first application schema. Meanwhile, a second application schema may be associated with sedans. The size of the truck bed may not be applicable to sedans. Therefore the data field for the size of the truck bed is not included in the second application schema.

In an embodiment, application schemas 122-124 are used to organize data sets (such as data sets 132-134) that are to be accessed by a same application 116 that is associated with base schema 118. As an example, a particular application may be associated with a base schema. The base schema may be associated with storing data sets related to vehicles. A first application schema, derived from the base schema, may be associated with pickup trucks. A second application schema, derived from the base schema, may be associated with sedans. The particular application may be used to access a first data set organized using the first application schema. The particular application may also be used to access a second data set organized using the second application schema.

In an embodiment, application schemas 122-124 correspond to different datastores. A datastore includes one or more data structures for organizing one or more data sets (such as data set 132 and/or data set 134) using an application schema (such as application schema 122 and/or application schema 124). Examples of data structures include a table, an array, a linked list, a tree, and a container (which is a collection of data structures). The organization of a datastore enables the contents of the datastore to be accessed, managed, and/or updated by a computer.

In an embodiment, various implementations of datastores may be used. Examples of datastores include a database instance, a pluggable database, and a data structure within a database instance, each of which is further described below.

I. Database Instance

In an embodiment, application schemas 122-124 correspond to different database instances. A database instance is a physical database and includes a set of memory structures and background processes for organizing a data set.

In an embodiment, memory structures of a datastore include a buffer cache, a redo log, and/or a shared pool. A buffer cache stores copies of data blocks currently or recently read from the data set. On a subsequent access request, the cached data blocks may be retrieved from the buffer cache rather than the data set.

A redo log stores redo entries, which describe current or recent changes made to the data set. In case of failure with the database instance and/or the data set, the redo log may be used to restore the most current version of the data set.

A shared pool stores copies of various current or recent program data. The shared pool stores parsed code (such as commands in Structured Query Language (SQL) or Java) for accessing the data set. On subsequent calls to the same code, the parsed code may be re-executed from the shared pool. Additionally or alternatively, the shared pool stores results returned from a query and/or a function. Results include, for example, a subset of a data set that matches criteria of a particular query.

In an embodiment, background processes of a datastore include a background monitoring process, a listener registration process, and a database writer process. A background monitoring process is configured to monitor the database instance and perform process recovery in case a process fails. Process recovery includes freeing up resources that were being used by the failed process, such as releasing database locks. The background monitoring process executes periodically, for example, every 3 seconds.

A listener registration process is configured to register a database instance with a listener. The listener is a server-side process that listens for incoming client connection requests and manages client traffic to the data set. The listener registration process provides the listener with the name and/or identifier of the database instance, and the addresses of service handlers of the database instance. A service handler is a process that serves as a connection point to a data set. The registration information enables the listener to select an appropriate service handler when a client request arrives and forward the client request to the selected service handler.

A database writer process is configured to write contents of a buffer cache to the data set, which may be stored on disk. The database writer process executes periodically and/or on an on-demand basis (such as, when no clean buffer caches are available).

II. Pluggable Database

In an embodiment, application schemas 122-124 correspond to different pluggable databases that execute under one instance, or copy, of a container database. The container database holds the functionality and metadata that applies to all pluggable databases included therein. Each pluggable database includes a separate schema for the corresponding pluggable database. Examples of pluggable databases are described in U.S. patent application Ser. No. 13/631,815, filed Sep. 28, 2012, now published as U.S. Patent Application Publication No. 2014/0095530, published Apr. 3, 2014, which claims priority to U.S. Provisional Patent Application No. 61/707,726, filed Sep. 28, 2012; and U.S. Provisional Patent Application No. 61/707,726, filed Sep. 28, 2012; which are hereby incorporated by reference.

Figure 1B:
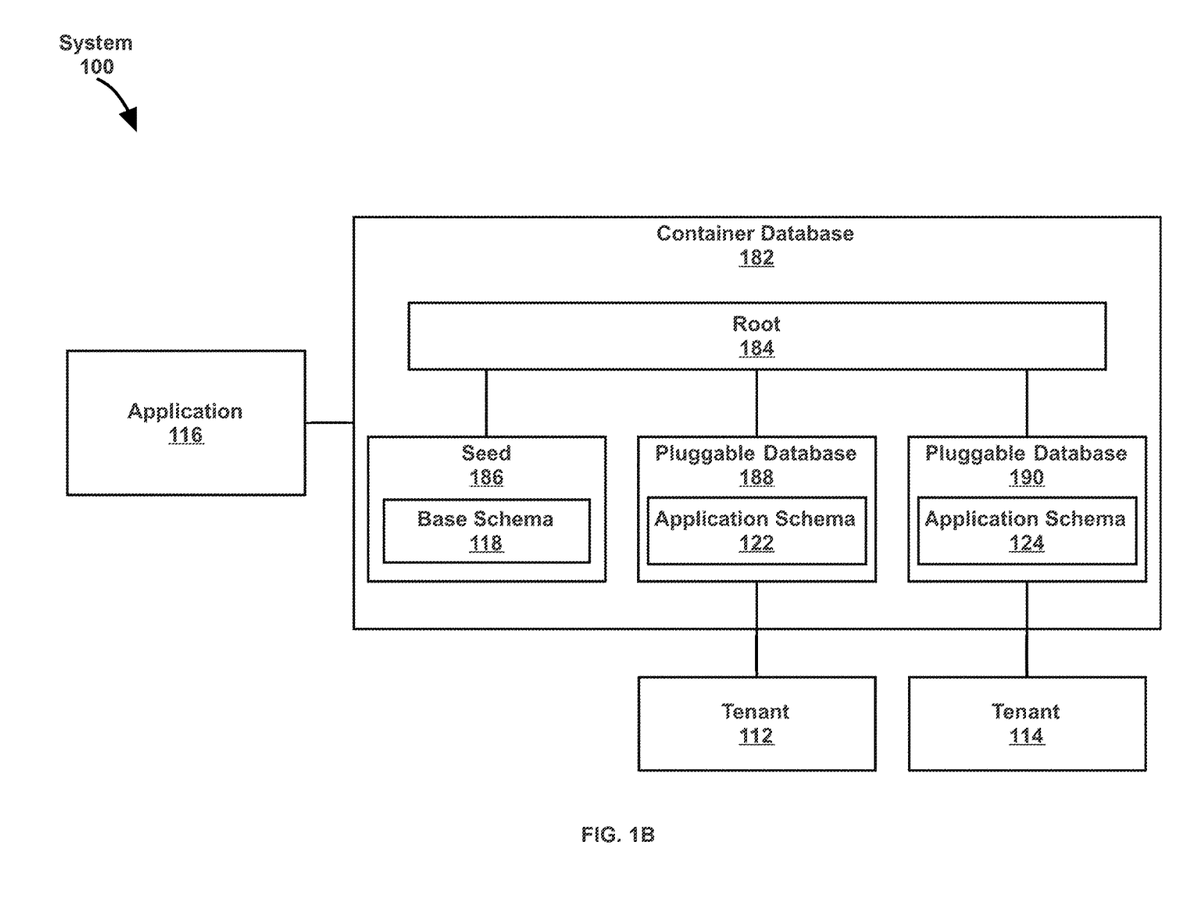
FIG. 1B illustrates an example of multiple pluggable databases executing under one instance of a container database, in accordance with one or more embodiments.

FIG. 1B illustrates an example of multiple pluggable databases executing under one instance of a container database, in accordance with one or more embodiments. As illustrated in FIG. 1B, system 100 includes tenants 112-114, an application 116, and container database 182. Container database 182 includes root 184, seed 186, pluggable database 188, and pluggable database 190. In one or more embodiments, system 100 may include more or fewer components than the components illustrated in FIG. 1B. The components illustrated in FIG. 1B may be local to or remote from each other. The components illustrated in FIG. 1B may be implemented in software and/or hardware and may be distributed over one or more applications and/or machines. Operations described with respect to one component may instead be performed by another component.

In an embodiment, system 100 operates in an off-premise environment (such as off-premise environment 104 in FIG. 1A). Application 116 is a shared computing resource of tenants 112-114. Application 116 accesses container database 182 to access data sets, of tenant 112 and/or tenant 114, stored at pluggable database 188 and/or pluggable database 190.

In an embodiment, container database 182 includes metadata that is used for organizing data sets across pluggable database 188 and pluggable database 190. The metadata is stored at root 184 and/or seed 186. Container database 182 further includes none, one, or more pluggable databases.

In an embodiment, container database 182 is implemented as a database instance. Container database 182 includes a set of memory structures (such as a buffer cache, redo log, and shared pool) and background processes (such as a background monitoring process, a listener registration process, and a database writer process).

In an embodiment, root 184 stores one or more code packages (such as SQL packages, or Procedural Language Extensions to SQL (PL/SQL) packages) common to accessing pluggable database 188 and pluggable database 190. A code package serves as an interface between application 116 and pluggable databases 188-190. The code package declares the types, variables, constants, exceptions, cursors, and subprograms available for use by application 116. Root 184 also stores common users, which are users that may access container database 182 and all pluggable databases 188-190 of container database 182.

In an embodiment, seed 186 is a template that container database 182 uses to generate new pluggable databases 188-190. Tenants 112-114 may not modify seed 186. In an embodiment, seed 186 includes base schema 118 as the template. As described above, base schema 118 indicates the names of data fields, the number of data fields, the number of tables, and other aspects of a default datastore that is used by application 116. Alternatively (not shown), seed 186 includes a template that has less data fields than base schema 118. Base schema 118 is derived from seed 186 and used in a pluggable database (such as pluggable database 188 and/or pluggable database 190).

In an embodiment, a pluggable database (such as pluggable database 188 and/or pluggable database 190) includes specific features for organizing a data set of a tenant (such as tenant 112 and/or tenant 114). Pluggable database 188 stores a data set of tenant 112, and pluggable database 190 stores a data set of tenant 114. Each pluggable database is derived from seed 186 (or another pluggable database) and modifiable by a tenant. In an embodiment, application schema 122 is used in pluggable database 188, and application schema 124 is used in pluggable database 190. Each of applicable schema 122 and application schema 124 is derived from base schema 118.

In an embodiment, each pluggable database relies on the set of memory structures (such as a buffer cache, redo log, and shared pool) of container database 182. Each pluggable database relies on the background processes (such as a background monitoring process, a listener registration process, and a database writer process) of container database 182. Each pluggable database does not have a separate set of memory structures and/or background processes performing the functions of container database 182.

III. Data Structure within Database Instance

In an embodiment, application schemas 122-124 correspond to separate data structures within a same database instance. As described above, a database instance is a physical database, requiring certain memory structures and background processes. Meanwhile, the separate data structures may not necessarily have individual respective memory structures and background processes. As an example, the separate data structures may rely on and share the background monitoring process of the database instance. As another example, the separate data structures may rely on and share the buffer cache of the database instance. The database instance is a datastore of the data structures contained therein. Each data structure is a datastore of a collection of data corresponding to a tenant.

In an embodiment, the separate data structures within a same database instance may be associated with different characteristics. As an example, separate data structures within a same database instance may be separate tables within a same database instance. As an example, the separate data structures may be of different types (such as a relational database, or an object-oriented database). As an example, the separate data structures may be accessed via different processes. A first set of processes, responding to requests received at a first port of a server, may be used to access a first data structure. A second set of processes, responding to requests received at a second port of a server, may be used to access a second data structure. As an example, the separate data structures may be set with different configurations. One example configuration is a caching policy, including for example the size of the cache, and triggers for caching. Another example configuration is an isolation level, which defines how and when changes to a data set made by one operation become visible to other operations. Another example configuration is a logging level, specifying the events (such as warnings, errors, and critical errors) that are to be logged.

B. On-Premise Environment

In one or more embodiment, an on-premise environment (such as on-premise environment 106) includes one or more devices located on a premise corresponding to a particular tenant (such as tenant 112). An on-premise environment may include, for example, a private data center of a particular tenant, or an office location of a particular tenant. An on-premise environment includes local computing resources that are accessed via local and/or private networks of a particular tenant.

In an embodiment, each on-premise environment is isolated from other on-premise environments. A tenant may not access an on-premise environment of another tenant. The isolation of an on-premise environment is implemented using a network security system over a private network. The network security system may include a firewall, which blocks unauthorized access to the network. The network security system may also include anti-virus and anti-spyware and intrusion prevention systems, to identify viruses and threats.

In an embodiment, on-premise environment 106 includes hardware executing application 152 and a datastore organized using application schema 162. Application 152 and the datastore organized using application schema 162 are associated with tenant 112 and are not shared with other tenants. On-premise environment 108 includes hardware executing application 154 and a datastore organized using application schema 164. Application 154 and the datastore organized using application schema 164 are associated with tenant 114 and are not shared with other tenants.

In an embodiment, an on-premise application is a traditional application that is executed in an on-premise environment. A tenant uses the on-premise application, while concurrently using an off-premise application 116. As an example, a tenant may use an on-premise application for a period of time. Subsequently the tenant may desire to use an off-premise application in addition to the on-premise application. The tenant may use the off-premise application in an off-premise environment, without migrating the on-premise application to the off-premise environment.

In an embodiment, application 116 and applications 152-154 may be different applications, or may be different functions within a same application. As an example, application 116 may manage the payroll of tenant 112 in a payroll application, and application 152 may manage the benefits of tenant 112 in a benefits application. As another example, application 116 and application 152 may be functions of a same payroll application. Application 116 may be configured to output paychecks for tenant 112, and application 152 may be configured to create a new employee record within the payroll application.

In an embodiment, dependencies exist between application 116 and applications 152-154. As an example, a function of application 116 may call a function of application 152. Conversely, a function of application 152 may call a function of application 116.

In one or more embodiments, an on-premise application schema (such as application schema 162 and/or 164) is an application schema corresponding to a datastore that is implemented in an on-premise environment (such as on-premise environment 106 and/or on-premise environment 108). In an embodiment, an on-premise application, in the same on-premise environment, uses the on-premise application schema to access one or more data sets.

In an embodiment, application schemas 122-124 and application schemas 162-164 are different from each other. Each application schema has different names of data fields, different numbers of data fields, different numbers of tables, and/or other differences.

In one or more embodiments, each on-premise data set (such as data set 172 and/or data set 174) is organized using a particular on-premise application schema (such as application schema 162 and/or application schema 164). Each data set is isolated from the data sets of other tenants. That is, tenant 112 cannot access data set 174 of tenant 114, and vice versa.

In an embodiment, an on-premise data set is stored in a traditional datastore in an on-premise environment. A tenant accesses the on-premise data set in the traditional datastore, while concurrently accessing an off-premise data set stored in a cloud-based datastore. As an example, a tenant may store a first data set at an on-premise datastore for a period of time. Subsequently the tenant may desire to store a second data set at a cloud-based datastore, which is implemented in an off-premise environment. The tenant may store the second data set at the cloud-based datastore, without migrating the first data set from the on-premise environment to off-premise environment 104.

In an embodiment, data sets 132-134 and data sets 172-174 may include overlapping or mutually-exclusive information. As an example, data set 132 may include a record of employee information, including an employee name, an employee identifier, and a residential address of the employee. Data set 172 may also include a record of employee information, including an employee name, an employee identifier, and a birthday of the employee. In this example, data set 132 and data set 172 would include overlapping information. The overlapping information would be the employee name and the employee identifier.

As another example, data set 132 may include a record of employee information. Data set 172 may include a record of office locations. The information in data set 132 would not be included in data set 172, and vice versa. In this example, data set 132 and data set 172 would include mutually-exclusive information.

C. Single Interface for Off-Premise and on-Premise Environments

In one or more embodiments, application 121 includes executable code and/or logic that is configured to execute operations, such as executing interface 120 for rendering user interface elements at a user interface device. Application 121 may be implemented in off-premise environment 104 and/or on-premise environments 106-108.

In an embodiment, application 121 is implemented in off-premise environment 104. Application 121 transmits user interface elements to be rendered to a browser. The browser is executed on a machine that is local to tenant 112 and/or tenant 114. As an example, application 121 may be a server-side application. The server-side application may transmit a webpage with the user interface elements to a browser. The webpage may be transmitted to the browser for rendering on a tenant's machine.

In an embodiment, application 121 is implemented in on-premise environment 106 and/or on-premise environment 108. Application 121 is installed on a machine that is local to tenant 112 and/or tenant 114. Application 121 causes user interface elements to be rendered at the local machine. As an example, application 121 may be a standalone application installed locally on a tenant's machine. The standalone application may execute an interface that presents user interface elements on the machine.

In one or more embodiments, interface 120 refers to hardware and/or software configured to facilitate communications and/or interactions between a user and applications 116, 152-154. Interface 120 is configured to access a datastore in off-premise environment 104 and a datastore in an on-premise environment (such as on-premise environment 106 and/or on-premise environment 108). Interface 120 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms. Interface 120 may be implemented in off-premise environment 104 and/or on-premise environments 106-108.

In another embodiment (not shown), separate interfaces are executed by each of application 116, application 152, and application 154. Each interface is configured to access a datastore in off-premise environment 104 and a datastore in an on-premise environment (such as on-premise environment 106 and/or on-premise environment 108. Application 116 executes a first interface. Application 116 transmits user interface elements to be rendered to a browser. The browser is executed on a machine that is local to tenant 112 and/or tenant 114. Additionally or alternatively, application 152 executes a second interface. Application 152 is installed locally on a machine of tenant 112. Application 152 causes user interface elements to be rendered at the machine. Additionally or alternatively, application 154 executes a third interface. Application 154 is installed locally on a machine of tenant 114. Application 154 causes user interface elements to be rendered at the machine.

3. ACCESSING ON-PREMISE AND OFF-PREMISE DATASTORES THAT ARE ORGANIZED USING DIFFERENT APPLICATION SCHEMAS

Figure 2:
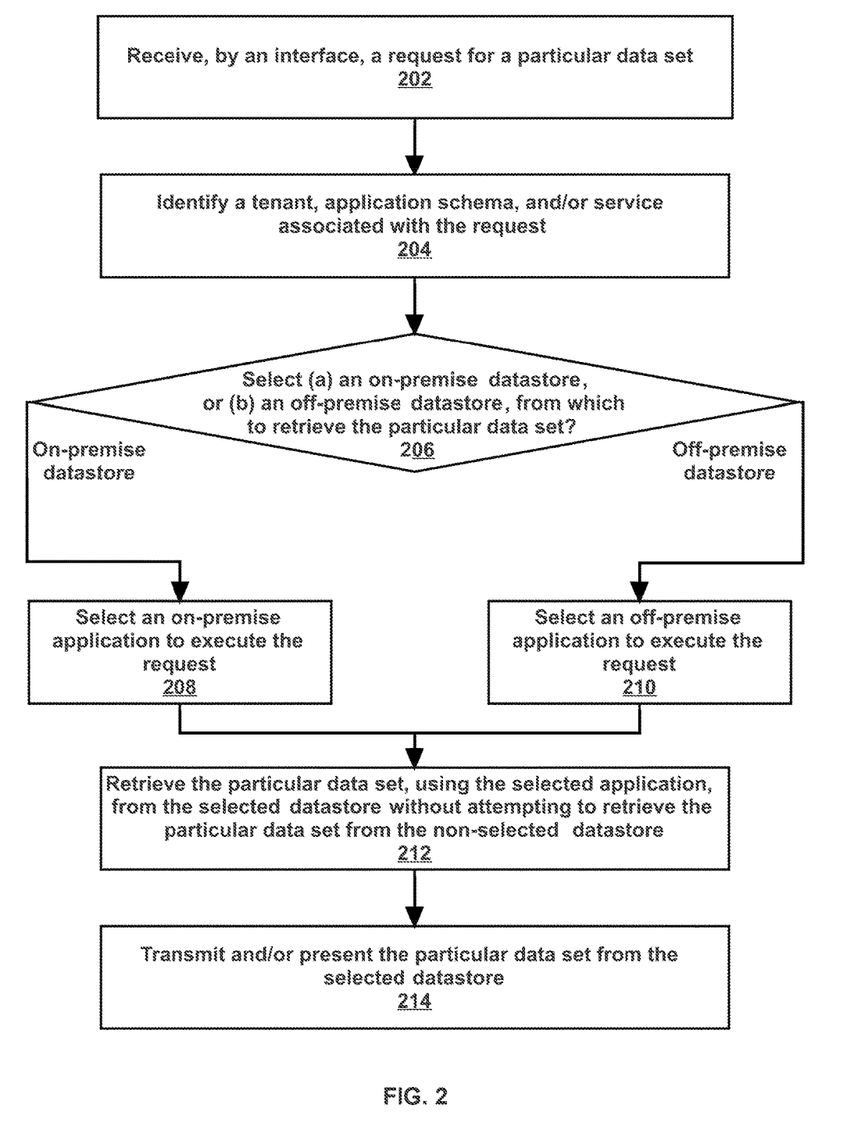
FIG. 2 illustrates an example set of operations for accessing on-premise and off-premise datastores that are organized using different application schemas, in accordance with one or more embodiments.

FIG. 2 illustrates an example set of operations for accessing on-premise and off-premise datastores that are organized using different application schemas, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

Initially, an interface receives a request for a particular data set (Operation 202). In an embodiment, the interface is implemented in an off-premise environment, and the interface receives the request via a public network, such as the Internet. In another embodiment, the interface is implemented in an on-premise environment, and the interface receives the request via a local network. The request does not include a specification of whether to access an on-premise datastore or an off-premise datastore to retrieve the particular data set.

One or more embodiments include identifying a tenant, application schema, and/or service associated with the request (Operation 204). In an embodiment, the request includes a particular user identifier (ID) of a user account that is being used to initiate the request. A look-up table is used to authenticate the particular user ID. The look-up table indicates a mapping between user IDs and tenant IDs. Based on the look-up table, the tenant ID corresponding to the particular user ID is identified.

In an embodiment, metadata indicates a mapping between tenant IDs and application schemas corresponding to the tenants. The metadata is stored in association with an application that is being accessed by the request. After a tenant ID associated with the request is identified, the tenant ID is used to identify a corresponding application schema.

In an embodiment, the request is mapped to one or more services based on a look-up table and/or logic statements. As an example, a first request may seek to add a new employee record to an employee database. The first request may then be mapped to a service that is configured to manage employee records. A second request may seek to modify the security settings of a user account associated with a particular employee. The second request may then be mapped to a service that is configured to manage security settings of employee accounts.

In an embodiment, the request is mapped to a first service, which depends on the use of a second service. Both the first service and the second service are associated with the request. As an example, a request may seek to determine a total sales revenue for the past quarter. The request may then be mapped to a first service that is configured to compute total sales revenue. The first service may depend on a second service that is configured to access sales records for the past quarter. The second service may be used to access the sales records, and the first service may be used to compute the total sales revenue from the sales records. Both the first service and the second service would be associated with the request.

In one or more embodiments, based on the tenant, application schema, and/or service, an inquiry is made as to whether to select (a) an on-premise datastore or (b) an off-premise datastore, from which to retrieve the particular data set (Operation 206). The selection of a datastore is based on a look-up table and/or logic statements.

In an embodiment, each datastore is associated with a tenant ID. A look-up table indicates a mapping between tenant IDs and datastores. Based on a tenant ID, an on-premise datastore or an off-premise datastore is selected.

In an embodiment, each datastore is associated with an application schema. The on-premise datastore has a different application schema than the off-premise datastore. When a particular application schema is being used, only the corresponding datastore may be accessed. If the particular application schema corresponds to an on-premise datastore, then the on-premise datastore is selected. Conversely, if the particular application schema corresponds to an off-premise datastore, then the off-premise datastore is selected.

In an embodiment, a look-up table indicates whether a service is associated with an on-premise datastore or an off-premise datastore. As an example, new services (for example, services that are published after a certain date) may be configured to access an on-premise datastore. Old services (for example, services that are published before a certain date) may be configured to access an off-premise datastore.

In one or more embodiments, if an on-premise datastore is selected, then an on-premise application is selected to execute the request (Operation 208). The on-premise application is implemented in an on-premise environment. As an example, the on-premise application may execute on a server that is located in an on-premise environment.

In one or more embodiments, if an off-premise datastore is selected, then an off-premise application is selected to execute the request (Operation 210). The off-premise application is implemented in an off-premise environment. As an example, the off-premise application may execute on a server that is located in an off-premise environment.

One or more embodiments include retrieving the particular data set from the selected datastore without attempting to retrieve the particular data set from the non-selected datastore. The particular data set is retrieved using the selected application (Operation 212). The selected application executes the request and accesses the corresponding datastore. The selected application executes various database commands (such as Structured Query Language (SQL) commands) to retrieve the particular data set from the corresponding datastore. The selected application does not attempt to retrieve the particular data set from another datastore.

One or more embodiments include transmitting and/or presenting the particular data set from the selected datastore (Operation 214). The particular data set is transmitted via a public and/or local network. The particular data set is presented using a set of user interface elements.

4. EXAMPLE EMBODIMENTS

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 3:
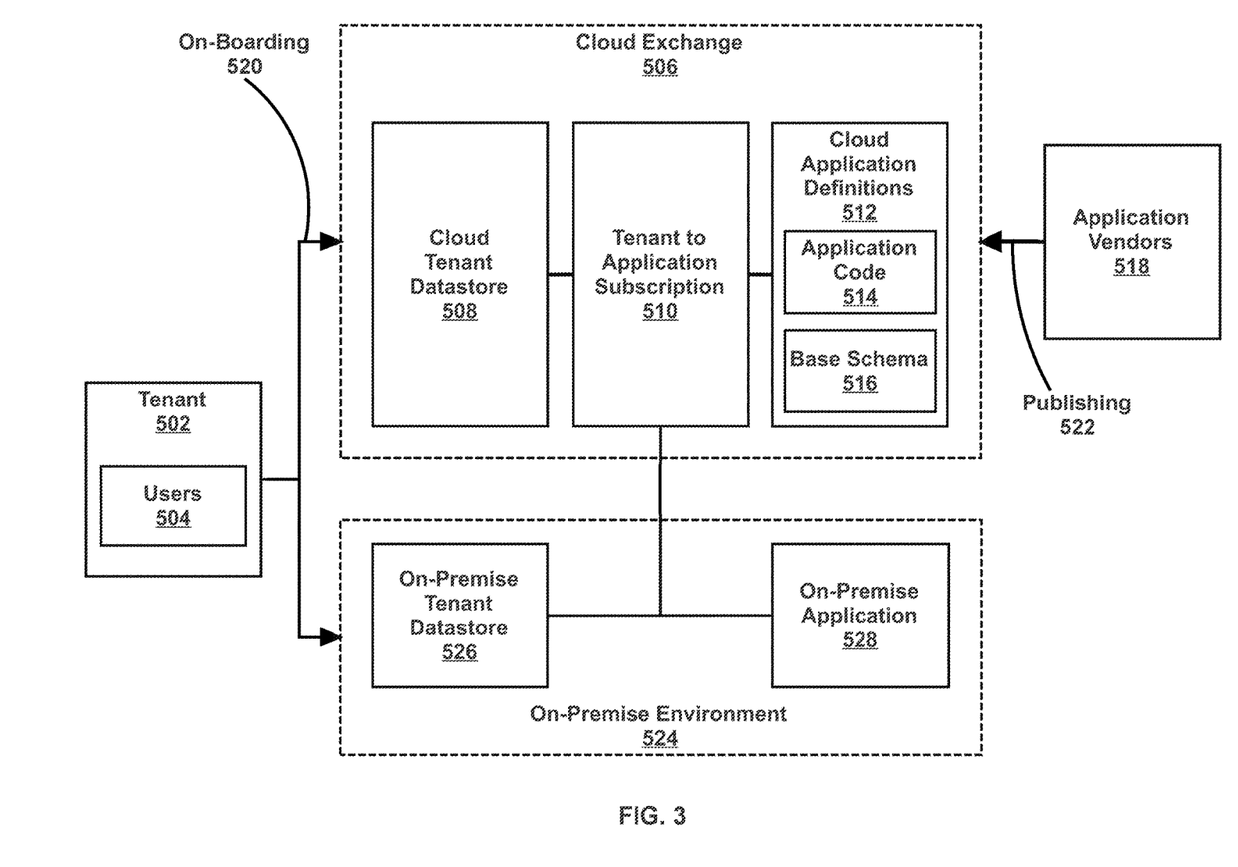
FIG. 3 illustrates examples of accessing on-premise and off-premise datastores using on-premise and off-premise applications, in accordance with one or more embodiments.

FIG. 3 illustrates examples of accessing on-premise and off-premise datastores using on-premise and off-premise applications, in accordance with one or more embodiments. FIG. 3 shows a tenant 502, cloud exchange 506, application vendors 518, and on-premise environment 524.

Tenant 502 is one of multiple tenants that share computing resources provided by cloud exchange 506. Tenant 502 gains access to cloud exchange 506 through an on-boarding process 520. Through the on-boarding process 520, a cloud tenant datastore 508 is assigned to tenant 502. Users 504 corresponding to tenant 502 are also specified.

Cloud tenant datastore 508 corresponding to tenant 502 is isolated from other cloud tenant datastores, available through cloud exchange 506, corresponding to other tenants. As an example, each tenant datastore may be implemented in a separate pluggable database. As another example, each tenant datastore may be implemented in a separate data structure within a same database instance.

Application vendors 518 provide cloud application definitions 512, which are maintained on the shared computing resources of cloud exchange 506, through a publishing process 522. Each application definition includes application code 514 and base schema 516. Application code 514 is configured to execute requests received from tenants of cloud exchange 506 (such as accessing cloud tenant datastore 508 of tenant 502). The same application code 514 is executed for multiple tenants. Base schema 516 indicates data fields and other characteristics of a default datastore for the corresponding application definition.

Tenants to application subscription 510 includes a list of subscribed cloud applications for each tenant. Subscription to a particular cloud application gives a tenant access to the particular cloud application. When tenant 502 subscribes to a particular cloud application, base schema 516 of the particular cloud application is copied as an application schema for cloud tenant datastore 508 of tenant 502. Tenant 502 may make customizations to the application schema for cloud tenant datastore 508, such as modifying names of existing data fields and/or adding new data fields.

On-premise tenant datastore 526 is a datastore that is implemented on hardware located at on-premise environment 524 corresponding to tenant 502. A data set stored at on-premise tenant datastore 526 may be accessed using on-premise application 528.

On-premise application 528 is an application that is implemented on hardware located at on-premise environment 524 corresponding to tenant 502. On-premise application 528 is configured to execute requests received from tenant 502 (such as accessing on-premise tenant datastore 526 of tenant 502).

On-premise application 528 is accessible via a user interface implemented at cloud exchange 506. As an example, a user interface implemented at cloud exchange 506 receives a request to access a particular data set from a particular user corresponding to tenant 502. The request includes a user identifier (ID) of the particular user. The user ID is mapped to a tenant ID associated with tenant 502.

Using a look-up table stored at a data repository, the request is mapped to a particular service corresponding to on-premise application 528 and/or on-premise tenant datastore 526 of tenant 502. Based on the mapping, on-premise application 528 retrieves the particular data set from on-premise tenant datastore 526. On-premise application 528 transmits the particular data set to the user interface implemented at cloud exchange 506. The user interface presents the particular data set.

As another example, a user interface implemented at cloud exchange 506 receives a request to access a particular data set from a particular user corresponding to tenant 502. The request includes a user identifier (ID) of the particular user. The user ID is mapped to a tenant ID associated with tenant 502.

Using a look-up table stored at a data repository, the request is mapped to a particular service corresponding to a cloud application definition. The cloud application definition includes dependencies on on-premise application 528. The particular service of the cloud application definition includes, for example, code and/or logic that calls a particular operation of on-premise application 528. The particular operation of on-premise application 528 retrieves the particular data set from on-premise tenant datastore 526. On-premise application 528 returns the particular data set to the particular service of the cloud application definition. The cloud application transmits the particular data set to the user interface. The user interface presents the particular data set.

5. CLOUD ENVIRONMENTS

In one or more embodiments, a cloud environment provides a centralized pool of resources that are shared amongst multiple client devices. Examples of resources include a processor, a server, a data storage, a virtual machine, and a platform. Client devices may independently request computing services, such as server time and network storage, as needed. The resources are dynamically assigned to the client devices on an on-demand basis. The resources assigned to each particular client device may be scaled up or down based on the computing services requested by the particular client device. The resources assigned to each particular client device may also be scaled up or down based on the aggregated demand for computing services requested by all client devices.

In an embodiment, the resources of a cloud environment are accessible over a network, such as a private network or the Internet. One or more physical and/or virtual client devices demanding use of the resources may be local to or remote from the resources. The client devices may be any type of computing devices, such as computers or smartphones, executing any type of operating system. The client devices communicate requests to the resources using a communications protocol, such as Hypertext Transfer Protocol (HTTP). The requests are communicated to the resources through an interface, such as a client interface (such as a web browser), a program interface, or an application programming interface (API).

In an embodiment, a cloud service provider provides a cloud environment to one or more cloud users. Various service models may be implemented by the cloud environment, including but not limited to Software-as-a-Service (SaaS), Platform-as-a-Service (PaaS), and Infrastructure-as-a-Service (IaaS). In SaaS, a cloud service provider provides cloud users the capability to use the cloud service provider's applications, which are executing on the cloud resources. In PaaS, the cloud service provider provides cloud users the capability to deploy onto the cloud resources custom applications, which are created using programming languages, libraries, services, and tools supported by the cloud service provider. In IaaS, the cloud service provider provides cloud users the capability to provision processing, storage, networks, and other fundamental computing resources provided in the cloud environment. Any arbitrary applications, including an operating system, may be deployed on the cloud resources.

In an embodiment, various deployment models may be implemented by a cloud environment, including but not limited to a private cloud, a public cloud, and a hybrid cloud. In a private cloud, cloud resources are provisioned for exclusive use by a particular group of one or more entities (the term "entity" as used herein refers to a corporation, organization, person, or other entity). The cloud resources may be located on the premises of one or more entities in the particular group, and/or at one or more remote off-premise locations. In a public cloud, cloud resources are provisioned for multiple entities (also referred to herein as "tenants"). Several tenants may use a same particular resource, such as a server, at different times and/or at the same time. In a hybrid cloud, the cloud environment comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In a multi-tenant environment, where multiple tenants share a same pool of resources 112, tenant isolation is implemented. Each tenant corresponds to a unique tenant identifiers (IDs). Data sets and/or applications implemented on cloud resources that are associated with a particular tenant are tagged with the tenant ID of the particular tenant. Before access to a particular data set or application is permitted, the tenant ID is verified to determine whether the corresponding tenant has authorization to access the particular data set or application.

In an embodiment, data sets corresponding to various tenants are stored as entries in a database. Each entry is tagged with the tenant ID of the corresponding tenant. A request for access to a particular data set is tagged with the tenant ID of the tenant making the request. The tenant ID associated with the request is checked against the tenant ID associated with the database entry of the data set to be accessed. If the tenant IDs are the same, then access to the database entry is permitted.

In an embodiment, data sets corresponding to various tenants are stored in different databases or data structures. Each database or data structure is tagged with the tenant ID of the corresponding tenant. A request for access to a particular data set is tagged with the tenant ID of the tenant making the request. The tenant ID associated with the request is checked against the tenant ID associated with the database or data structure storing the data set to be accessed. If the tenant IDs are the same, then access to the database or data structure is permitted.

In an embodiment, a subscription list indicates which tenants have authorization to access which applications. For each application, a list of tenant IDs of each tenant having authorization to access the application is stored. A request for access to a particular application is tagged with the tenant ID of the tenant making the request. The tenant ID associated with the request is checked against the subscription list to determine whether the tenant is authorized to access the application. If the tenant ID associated with the request is included in the list of tenant IDs of tenants having authorization to access the application, then access to the application is permitted.

In an embodiment, data sets and virtual resources (e.g., virtual machines, application instances, and threads) corresponding to different tenants are isolated to tenant-specific overlay networks maintained by the cloud environment. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
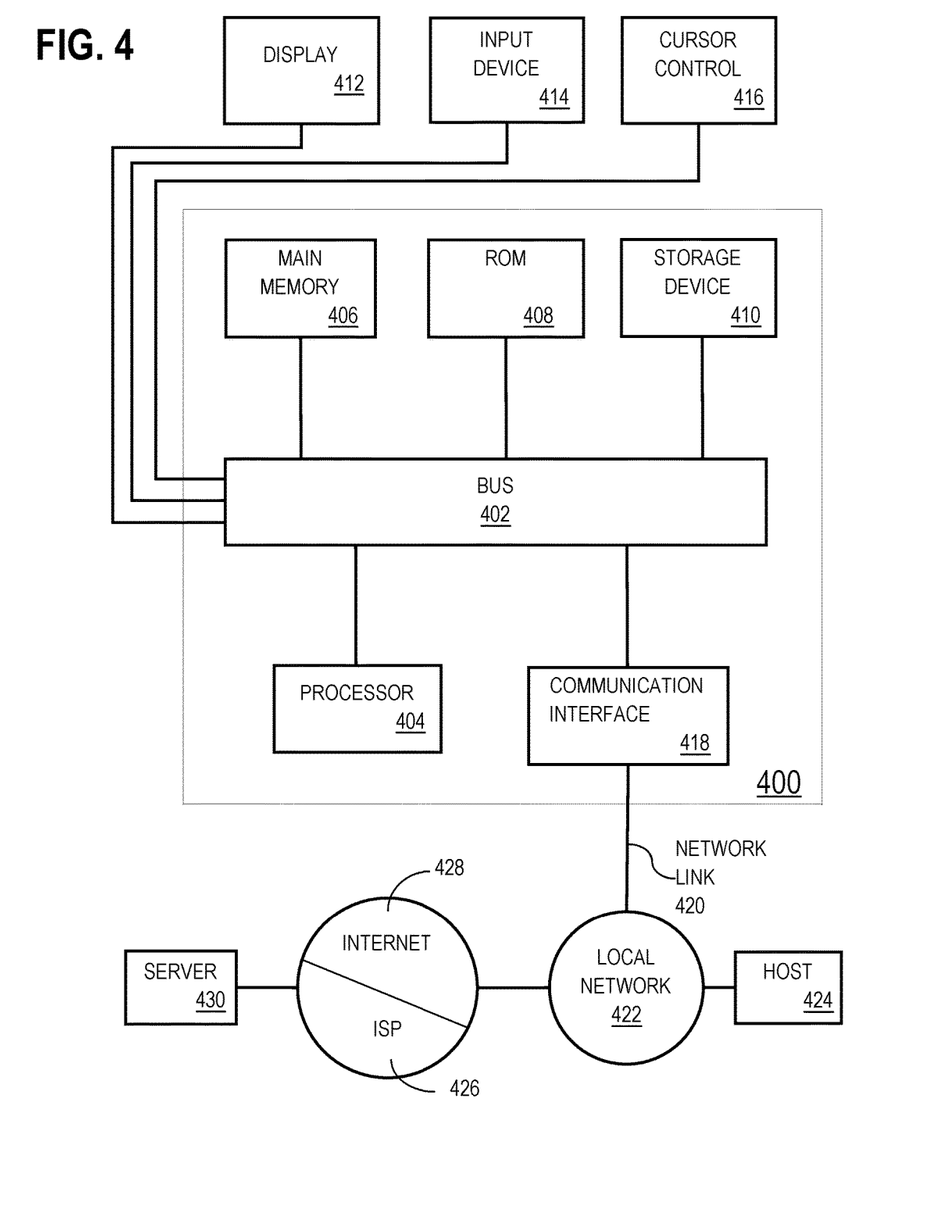
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   identifying a first set of services corresponding to an on-premise datastore organized using a first application schema;
   identifying a second set of services corresponding to an off-premise datastore organized using a second application schema different than the first application schema;
   receiving, by an interface, a first request for a first data set;
   identifying a first service to be used for responding to the first request;
   responsive to determining that the first service is within the first set of services and not within the second set of services, selecting the on-premise datastore to retrieve the first data set;
   retrieving the first data set from the on-premise datastore without attempting to retrieve the first data set from the off-premise datastore;
   transmitting or presenting the first data set from the on-premise datastore;
   receiving, by the interface, a second request for a second data set
   identifying a second service to be used for responding to the second request
   responsive to determining that the second service is within the second set of services and not within the first set of services, selecting the off-premise datastore to retrieve the second data set
   retrieving the second data set from the off-premise datastore without attempting to retrieve the second data set from the on-premise datastore; and
   transmitting or presenting the second data set from the off-premise datastore.

2. The medium of claim 1, wherein the first request does not include a specification of whether to access the on-premise datastore or the off-premise datastore to retrieve the first data set.

3. The medium of claim 1, wherein retrieving the first data set from the on-premise datastore comprises receiving the first data set from an application that accesses the on-premise datastore.

4. The medium of claim 1, wherein:
   selecting the on-premise datastore to retrieve the first data set comprises selecting a first application executing on-premise to retrieve the first data set from the on-premise datastore; and
   selecting the off-premise datastore to retrieve the second data set comprises selecting a second application executing off-premise to retrieve the second data set from the off-premise datastore.

5. The medium of claim 1, wherein retrieving the first data set from the on-premise datastore comprises retrieving, by an application executing the interface, the first data set from the on-premise datastore.

6. The medium of claim 1, wherein:
   selecting the on-premise datastore to retrieve the first data set comprises selecting a first application executing on-premise to retrieve the first data set from the on-premise datastore;
   selecting the off-premise datastore to retrieve the second data set comprises selecting a second application executing off-premise to retrieve the second data set from the off-premise datastore; and
   retrieving the first data set from the on-premise datastore comprises receiving the first data set from an application that accesses the on-premise datastore.

7. The medium of claim 1, wherein the first set of services comprises services published prior to a particular date, and the second set of services comprises services published after the particular date.

8. A system comprising:
   at least one hardware processor including a processor; and
   the system configured to perform operations comprising:
      identifying a first set of services corresponding to an on-premise datastore organized using a first application schema;
      identifying a second set of services corresponding to an off-premise datastore organized using a second application schema different than the first application schema;
      receiving, by an interface, a first request for a first data set;
      identifying a first service to be used for responding to the first request
      responsive to determining that the first service is within the first set of services and not within the second set of services, selecting the on-premise datastore to retrieve the first data set;
      retrieving the first data set from the on-premise datastore without attempting to retrieve the first data set from the off-premise datastore;
      transmitting or presenting the first data set from the on-premise datastore;
      receiving, by the interface, a second request for a second data set
      identifying a second service to be used for responding to the second request
      responsive to determining that the second service is within the second set of services and not within the first set of services, selecting the off-premise datastore to retrieve the second data set
      retrieving the second data set from the off-premise datastore without attempting to retrieve the second data set from the on-premise datastore, and
      transmitting or presenting the second data set from the off-premise datastore.

9. The system of claim 8, wherein retrieving the first data set from the on-premise datastore comprises receiving the first data set from an application that accesses the on-premise datastore.

10. The system of claim 8, wherein:
    selecting the on-premise datastore to retrieve the first data set comprises selecting a first application executing on-premise to retrieve the first data set from the on-premise datastore; and
    selecting the off-premise datastore to retrieve the second data set comprises selecting a second application executing off-premise to retrieve the second data set from the off-premise datastore.

11. The system of claim 8, wherein retrieving the first data set from the on-premise datastore comprises retrieving, by an application executing the interface, the first data set from the on-premise datastore.

12. The system of claim 8, wherein the first request does not include a specification of whether to access the on-premise datastore or the off-premise datastore to retrieve the first data set.

13. The system of claim 8, wherein the first set of services comprises services published prior to a particular date, and the second set of services comprises services published after the particular date.

14. A method comprising:
identifying a first set of services corresponding to an on-premise datastore organized using a first application schema;
identifying a second set of services corresponding to an off-premise datastore organized using a second application schema different than the first application schema;
receiving, by an interface, a first request for a first data set;
identifying a first service to be used for responding to the first request
responsive to determining that the first service is within the first set of services and not within the second set of services, selecting the on-premise datastore to retrieve the first data set;
retrieving the first data set from the on-premise datastore without attempting to retrieve the first data set from the off-premise datastore;
transmitting or presenting the first data set from the on-premise datastore;
receiving, by the interface, a second request for a second data set
identifying a second service to be used for responding to the second request
responsive to determining that the second service is within the second set of services and not within the first set of services, selecting the off-premise datastore to retrieve the second data set;
retrieving the second data set from the off-premise datastore without attempting to retrieve the second data set from the on-premise datastore; and
transmitting or presenting the second data set from the off-premise datastore.

15. The method of claim 14, wherein the first request does not include a specification of whether to access the on-premise datastore or the off-premise datastore to retrieve the first data set.

16. The method of claim 14, wherein retrieving the first data set from the on-premise datastore comprises receiving the first data set from an application that accesses the on-premise datastore.

17. The method of claim 14, wherein:
selecting the on-premise datastore to retrieve the first data set comprises selecting a first application executing on-premise to retrieve the first data set from the on-premise datastore; and
selecting the off-premise datastore to retrieve the second data set comprises selecting a second application executing off-premise to retrieve the second data set from the off-premise datastore.

18. The method of claim 14, wherein the first set of services comprises services published prior to a particular date, and the second set of services comprises services published after the particular date.

\* \* \* \* \*

UNITED STATES PATENT AND TRADEMARK OFFICE
CERTIFICATE OF CORRECTION

PATENT NO. : 10,289,617 B2
APPLICATION NO. : 14/973325
DATED : May 14, 2019
INVENTOR(S) : Lam et al.

Page 1 of 1

It is certified that error appears in the above-identified patent and that said Letters Patent is hereby corrected as shown below:

In the Claims

Column 19, Line 26, Claim 1, delete "data set" and insert -- data set; --, therefor.

Column 19, Line 28, Claim 1, delete "request" and insert -- request; --, therefor.

Column 19, Line 32, Claim 1, delete "data set" and insert -- data set; --, therefor.

Column 20, Line 22, Claim 8, delete "request" and insert -- request; --, therefor.

Column 20, Line 34, Claim 8, delete "data set" and insert -- data set; --, therefor.

Column 20, Line 36, Claim 8, delete "request" and insert -- request; --, therefor.

Column 20, Line 40, Claim 8, delete "data set" and insert -- data set; --, therefor.

Column 20, Line 43, Claim 8, delete "datastore," and insert -- datastore; --, therefor.

Column 21, Line 15, Claim 14, delete "request" and insert -- request; --, therefor.

Column 21, Line 26, Claim 14, delete "data set" and insert -- data set; --, therefor.

Column 21, Line 28, Claim 14, delete "request" and insert -- request; --, therefor.

Signed and Sealed this
Twenty-first Day of July, 2020

Andrei Iancu
*Director of the United States Patent and Trademark Office*